(12) United States Patent
Mckinion et al.

(10) Patent No.: US 12,222,138 B2
(45) Date of Patent: Feb. 11, 2025

(54) FREE-STANDING LOAD SUPPORT SYSTEM

(71) Applicant: Helical Solar Solutions, LLC, Austin, TX (US)

(72) Inventors: James Mckinion, Austin, TX (US); Keith Becker, Cedar Park, TX (US)

(73) Assignee: Helical Solar Solutions, LLC, Horseshoe Bay, TX (US)

( * ) Notice: Subject to any disclaimer, the term of this patent is extended or adjusted under 35 U.S.C. 154(b) by 333 days.

(21) Appl. No.: 17/729,879

(22) Filed: Apr. 26, 2022

(65) Prior Publication Data

US 2022/0373229 A1 Nov. 24, 2022

Related U.S. Application Data (60) Provisional application No. 63/192,455, filed on May 24, 2021.

(51) Int. Cl.
*F24S 25/12* (2018.01)
*F24S 25/617* (2018.01)

(52) U.S. Cl.
CPC .............. *F24S 25/12* (2018.05); *F24S 25/617* (2018.05)

(58) Field of Classification Search
CPC ......... F24S 25/12; F24S 25/617; E04H 6/025; E04H 12/18; E04H 12/22; E04H 12/2215; E04H 12/2223; H02S 20/10; H02S 20/30
See application file for complete search history.

(56) References Cited

U.S. PATENT DOCUMENTS

| | | |
|---|---|---|
| 4,875,660 A | 10/1989 | Gagnon et al. |
| 4,995,377 A | 2/1991 | Eiden |
| 5,002,435 A | 3/1991 | Dupeuble |
| 5,066,168 A | 11/1991 | Holdeman |
| 5,088,681 A | 2/1992 | Procaccianti et al. |
| 5,683,207 A | 11/1997 | Mauer |

(Continued)

FOREIGN PATENT DOCUMENTS

| | | | | |
|---|---|---|---|---|
| KR | 20210077226 A | * | 6/2021 | |
| WO | WO-2013109186 A1 | * | 7/2013 | ............... E02D 5/22 |
| WO | WO-2014162834 A1 | * | 10/2014 | ............. F24J 2/5207 |

OTHER PUBLICATIONS

Earth Contact Products, ECP Solar Foundation—ECP "One Step" Solar Foundation, Feb. 17, 2017, 1-2 pp.

(Continued)

*Primary Examiner* — Theodore V Adamos
(74) *Attorney, Agent, or Firm* — Brian F. Russell (57) ABSTRACT

A load support system includes an elongate support member having a first diameter and first and second ends. The elongate support member includes, toward the first end, a first portion for direct earth burial and further includes, toward the second end, a second portion to which the load can be coupled. The system additionally includes a lateral support having a second diameter greater than the first diameter and a second length less than a first length of the first portion. The lateral support is mounted about the first portion of the elongate support member. The lateral support includes a first opening formed therein at a first location relative to a long axis of the elongate support member and a second opening formed therein at a different second location relative to the long axis in order to support a range of embedment depths.

28 Claims, 7 Drawing Sheets

(56) References Cited

U.S. PATENT DOCUMENTS

| | | | |
|---|---|---|---|
| 5,730,117 A | 3/1998 | Berger | |
| 5,833,399 A | 11/1998 | Bullivant | |
| 5,904,447 A | 5/1999 | Sutton et al. | |
| 5,919,005 A | 7/1999 | Rupiper | |
| 5,927,905 A | 7/1999 | Van Halteren | |
| 6,058,930 A | 5/2000 | Shingleton | |
| 6,142,712 A * | 11/2000 | White | E02D 7/28 |
| | | | 405/249 |
| 6,386,295 B1 | 5/2002 | Suver | |
| 6,399,881 B2 | 6/2002 | Edelstein | |
| 6,552,257 B1 | 4/2003 | Hart et al. | |
| 6,652,195 B2 | 11/2003 | Vickars et al. | |
| 6,662,801 B2 | 12/2003 | Hayden et al. | |
| 6,722,821 B1 * | 4/2004 | Perko | E02D 5/801 |
| | | | 405/249 |
| 6,761,387 B2 | 7/2004 | Sloss | |
| 6,814,525 B1 | 11/2004 | Whitsett | |
| 6,820,379 B1 | 11/2004 | Krinner et al. | |
| 6,824,331 B2 | 11/2004 | Parker et al. | |
| 6,942,430 B1 * | 9/2005 | Suver | E02D 7/22 |
| | | | 405/253 |
| 7,004,683 B1 | 2/2006 | Rupiper | |
| 7,413,035 B1 | 8/2008 | Miller | |
| 7,731,454 B1 | 6/2010 | Watson et al. | |
| 7,770,669 B1 | 8/2010 | Desrochers et al. | |
| 7,854,451 B2 | 12/2010 | Davis | |
| 8,052,100 B2 | 11/2011 | Zante | |
| 8,371,771 B1 | 2/2013 | Lugo et al. | |
| 8,407,950 B2 | 4/2013 | Hartelius | |
| 8,602,689 B1 | 12/2013 | Van et al. | |
| 8,763,601 B2 | 7/2014 | Doyle | |
| 8,863,450 B2 | 10/2014 | Anderson et al. | |
| 9,051,706 B1 | 6/2015 | Ludwig | |
| 9,068,318 B1 | 6/2015 | Gochis | |
| 9,231,141 B2 | 1/2016 | Kirchner et al. | |
| 9,416,512 B2 * | 8/2016 | Suver | E02D 5/50 |
| 9,422,741 B1 | 8/2016 | Conte | |
| 10,119,291 B2 * | 11/2018 | McKinion | E04H 12/2223 |
| 2003/0159839 A1 | 8/2003 | Perko | |
| 2004/0076479 A1 | 4/2004 | Camilleri | |
| 2004/0103599 A1 | 6/2004 | Keck | |
| 2004/0231257 A1 | 11/2004 | Brown | |
| 2005/0097833 A1 | 5/2005 | Campbell et al. | |
| 2006/0001271 A1 | 1/2006 | Zugaza et al. | |
| 2007/0000187 A1 * | 1/2007 | St. Onge | E02D 5/80 |
| | | | 52/165 |
| 2007/0231081 A1 | 10/2007 | Gantt, Jr. | |
| 2010/0319272 A1 | 12/2010 | Kellner | |
| 2011/0099923 A1 | 5/2011 | Ventura et al. | |
| 2011/0194901 A1 | 8/2011 | Jones | |
| 2011/0297141 A1 | 12/2011 | Correia et al. | |
| 2012/0114425 A1 | 5/2012 | Seider et al. | |
| 2012/0213597 A1 | 8/2012 | Baumsteiger | |
| 2013/0160380 A1 | 6/2013 | Atchley | |
| 2013/0256246 A1 * | 10/2013 | Tagliamonte | H02S 20/00 |
| | | | 211/41.1 |
| 2014/0069483 A1 * | 3/2014 | Wolter | F24S 25/70 |
| | | | 136/246 |
| 2014/0283894 A1 | 9/2014 | Silver | |
| 2014/0311552 A1 * | 10/2014 | Garrett | F24S 25/617 |
| | | | 136/251 |
| 2014/0356075 A1 * | 12/2014 | Hale | E02D 7/02 |
| | | | 405/230 |
| 2015/0247336 A1 | 9/2015 | Bergman | |
| 2016/0069075 A1 * | 3/2016 | Powers, III | E04B 7/163 |
| | | | 52/93.2 |
| 2016/0215519 A1 | 7/2016 | Bergman | |
| 2018/0238072 A1 * | 8/2018 | Mckinion | H01Q 1/1242 |

OTHER PUBLICATIONS

Maier et al. "Increasing Lateral Capacity of Helical Piles with Lateral Restraint Devices", Missouri University of Science and Technology, May 26, 10 pages.

Terrell Croft, "A Reference Book for Practical Electrical Workers", First Edition, Second impression-Corrected, 1914, 329, 331 & 332 pp.

* cited by examiner

PRIOR ART

*Figure 10*

FREE-STANDING LOAD SUPPORT SYSTEM

This invention was made with Government support under DE-SC0019890 awarded by the U.S. Department of Energy (DOE). The Government has certain rights in this invention.

BACKGROUND OF THE INVENTION

This disclosure relates in general to a free-standing load support system. More particularly, the present disclosure relates to a load support system suitable for a range of embedment depths.

A variety of supports have conventionally been utilized to provide an attachment location for a load. Often, ground-based supports take the form of a substantial steel-reinforced concrete foundation to which a pole is attached by multiple bolts or other anchors. A common example of such a ground-based support is a street light post. Alternatively, a ground-based support may include a multi-member mast, which may optionally be stabilized by one or more guy-wires. A common example of this type of construction is an antenna mast or a utility pole. The present disclosure recognizes that such supports are expensive to install and often require deployment of multiple crews each having only a subset of skills needed to erect the support and/or attach a load to the support.

In US10119291B2, the inventor hereof discloses a free-standing load support system designed for direct embedment in the soil. In practice, the composition of soils and the depths at which obstructive layers are present in soils varies widely geographically. The present disclosure appreciates that it would be desirable to be able to securely install a free-standing load support system at a range of embedment depths, depending on the soil conditions and soil compositions at various installation locations. Further, the present disclosure recognizes that it would be desirable to provide a load support system that is suitable for installation in a variety of soils utilizing existing tools and equipment.

BRIEF SUMMARY

In at least one embodiment, a load support system includes an elongate support member having a first diameter and a first end and a second end. The elongate support member includes, toward the first end, a first portion for direct earth burial and further includes, toward the second end, a second portion to which the load can be coupled. The first portion has a first length. The system additionally includes a lateral support having a second diameter greater than the first diameter and a second length less than the first length. The lateral support is mounted about the first portion of the elongate support member. The lateral support includes a first opening formed therein at a first location relative to a long axis of the elongate support member and a second opening formed therein at a different second location relative to the long axis in order to support a range of embedment depths.

In at least some embodiments, the load support system further includes a helix formed at least partially about the lateral support.

In at least some embodiments, the load support system further includes a pedestal for coupling the load to the elongate support member.

In at least some embodiments, the lateral support includes a first opening formed therein at a first location relative to a long axis of the elongate support member and the elongate support member includes a second opening formed therein at a different second location relative to the long axis of the elongate support member, such that a range of embedment depths of the first portion of the elongate support member is supported.

In at least some embodiments, the second portion of the elongate support member has multiple sets of load mounting holes formed therein, such that a range of embedment depths of the first portion of the elongate support member is supported.

In at least some embodiments, an interior volume of the lateral support is selected to determine an embedment depth of the first portion of the elongate support member.

In at least some embodiments, a system includes both a load support system and a load, which may include, for example, at least one solar panel or a wind turbine.

The inventions disclosed herein further include methods of manufacturing, methods of installation, and methods of use. In one example, a method of installing a load support system includes providing a load support system, including an elongate support member having a first diameter and a first end and a second end. The elongate support member includes, toward the first end, a first portion for direct earth burial and further includes, toward the second end, a second portion to which the load can be coupled, wherein the first portion has a first length. The load support system additionally includes a lateral support having a second diameter greater than the first diameter and a second length less than the first length, wherein the lateral support is mounted about the first portion of the elongate support member. The installation method additionally includes forming a bore in the earth having a diameter less than that of the lateral support, placing the first end of the elongate support member in the bore, and rotationally installing the first portion of the elongate support member in the earth.

DETAILED DESCRIPTION

Figure 1:
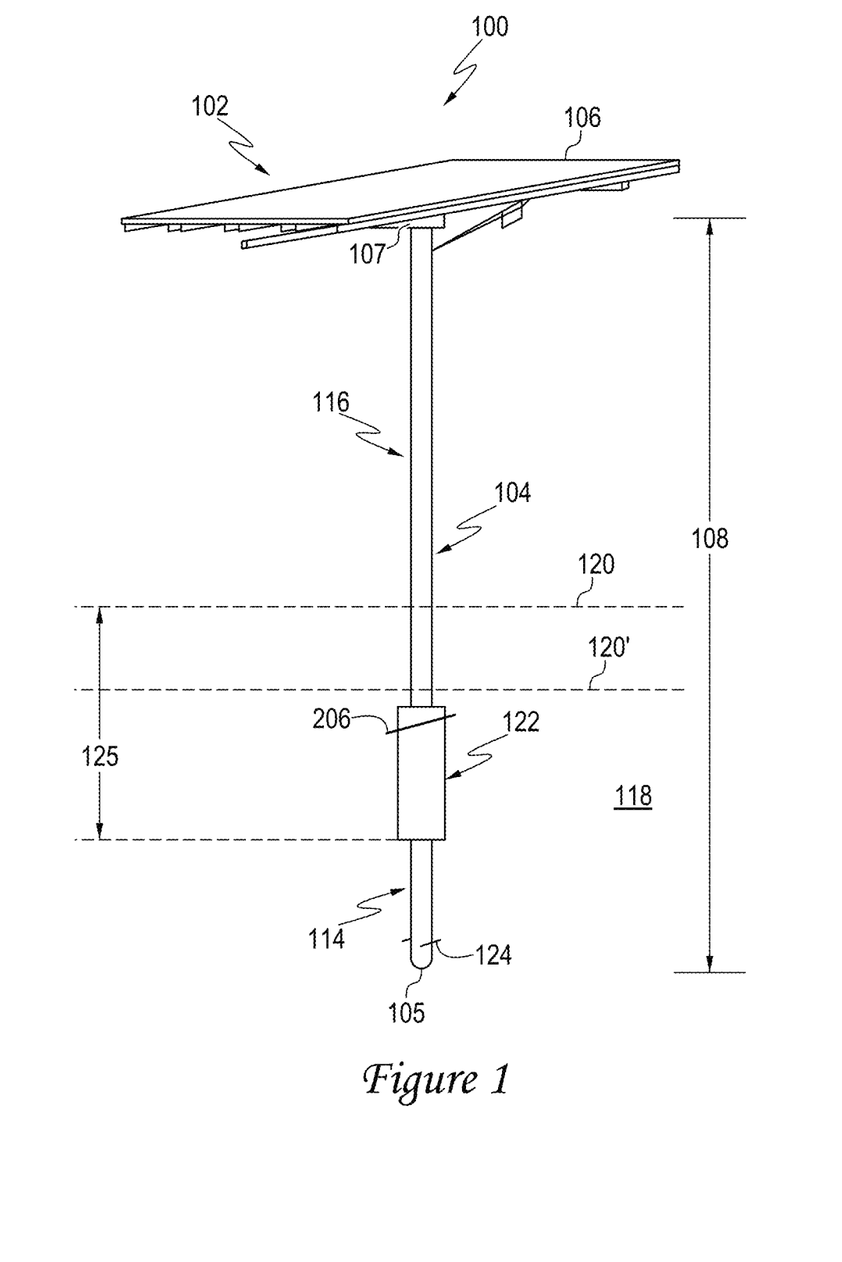
FIG. 1 illustrates an exemplary load support system in accordance with one embodiment.

With reference now to the figures and with particular reference to FIG. 1, there is illustrated an elevation view of an installation site 100 including a load support system 102 in accordance with one embodiment.

Load support system 102 includes an elongate support member 104 for supporting a load 106, such as, for example, a solar panel array. In various embodiments, elongate support member 104 may be, for example, a tube, pole or rod, which may be formed, for example, of steel, aluminum (or other metal), wood, concrete, etc. Although it is generally preferred if elongate support member 104 has a round cross-section, members of other cross-sections (e.g., square, rectangular, pentagonal, hexagonal, octagonal, irregular, etc.) may be used. In one example, elongate support member 104 is a round galvanized steel tube having a hollow interior volume.

Elongate support member 104 has a first end 105 and a second end 107 and includes, toward first end 105, a first portion 114, and further includes, toward second end 107, a second portion 116. In the illustrated embodiment, first portion 114 is configured for direct earth burial in the earth 118 below the earth's surface. In general, it is desired for elongate support member 104 to be embedded approximately vertically (i.e., with its long axis aligned with the direction of the earth's gravitational force); however, in certain installations, other installation angles of elongate support member 104 relative to the earth's gravitational force may be desirable and/or permissible.

In accordance with preferred embodiments, elongate support member 104 is configured to support a range of embedment depths in different installations, for example, based on the soil conditions and soil composition. For example, in some cases, following installation the earth's surface 120 may be relatively closer to second end 107; in other cases, the earth's surface 120' may be relatively further from second end 107. The length of first portion 114 (i.e., the depth of embedment of elongate support member 104 in the earth) may be selected based on one or more factors, such as the soil condition (e.g., compacted/non-compacted, moist/dry, etc.), soil type (composition), the weight and dimensions of the load, the dimensions of elongate support member 104, the material selected for elongate support member, the maximum torque that is applied to elongate support member 104 during installation by the installation equipment, etc. Various standards can also be used to determine an appropriate depth of embedment for a particular load, application, and installation site, including standards adopted by the Outdoor Advertising Association of America, Inc. and *Lineman's and Cableman's Handbook,* 12$^{th}$ Ed., McGraw Hill, 2012, as well as local, state and national building codes. For example, in some embodiments, the depth of embedment is determined as 10% of the length 108 of elongate support member 104 plus 2 feet. In other embodiments, the depth of embedment is determined as ⅙ of the length of elongate support member 104. In the illustrated embodiment, the depth of embedment is approximately half of the length 108; for example, if length 108 is 21 feet, the embedment depth is between about 9 feet to about 14 feet, and more particularly, between about 10 feet and 13 feet. In some cases, it is desirable to have a minimum embedment depth of 10 feet to allow installation of elongate support member 104 without a supplemental grounding rod in compliance with the National Electric Code (NEC).

As further illustrated in FIG. 1, first end 105 of elongate support member 104 can optionally be configured with one or more earth-engaging features, such as spade tip(s) (best seen in FIG. 3), teeth, and/or or an external helix 124. In at least embodiments such as that shown in which first portion 114 is intended for direct earth burial, a load support system 102 preferably further includes a lateral support 122 that enhances the lateral stability of load support system 102. As depicted in FIG. 1, lateral support 122 is rigidly coupled (e.g., welded, clamped, bolted, etc.) to first portion 114 and preferably has a length that is less than the length of first portion 114 and an outer diameter that is greater than that of first portion 114. In some embodiments, lateral support 122 may be formed of a length of metal (e.g., galvanized steel or aluminum), plastic (e.g., PVC) or composite tube having a round cross-section. It should be appreciated, however, that members of other cross-sections (e.g., square, pentagonal, hexagonal, octagonal, irregular, etc.) may alternatively be used.

Figure 2:
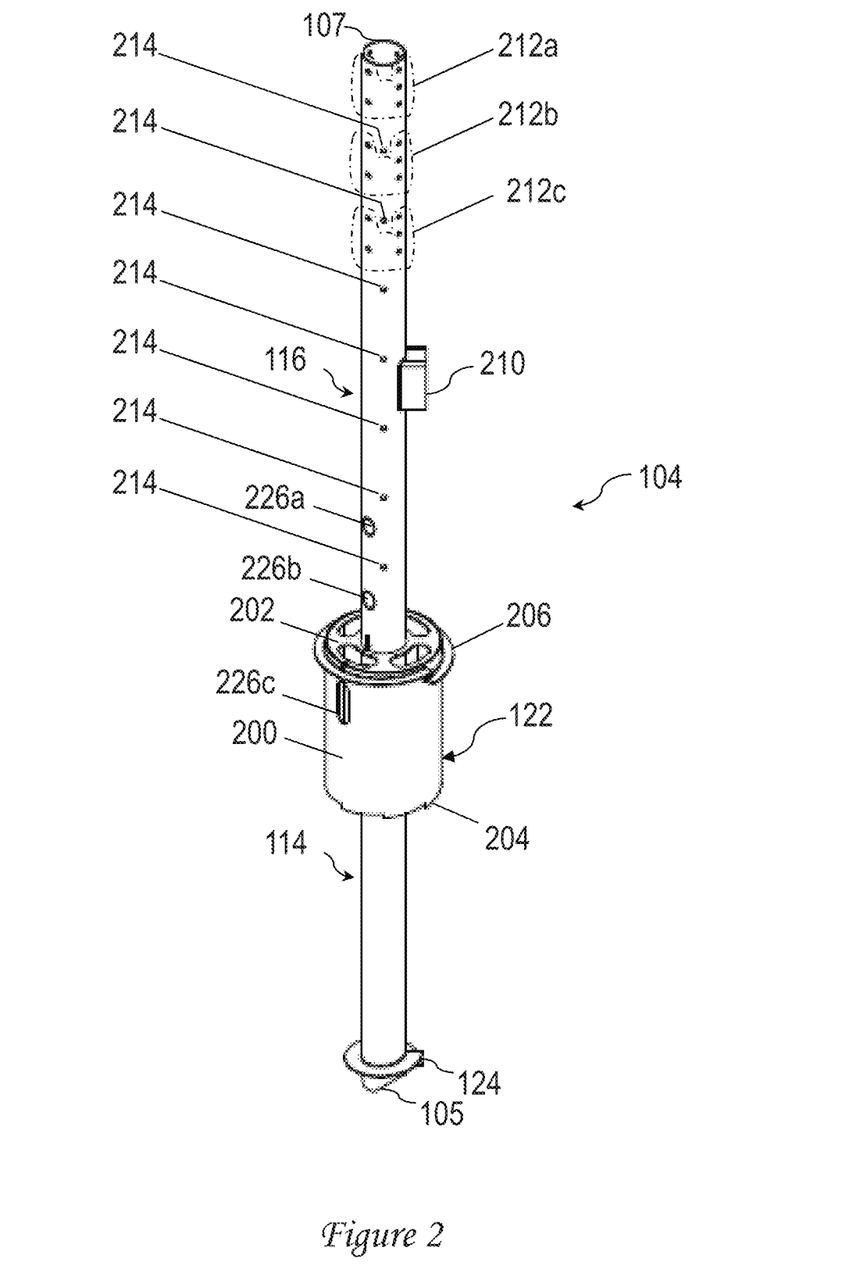
FIGS. 2-3 are more detailed perspective and elevation views of an exemplary elongate support member in the load support system of FIG. 1.
Figure 3:
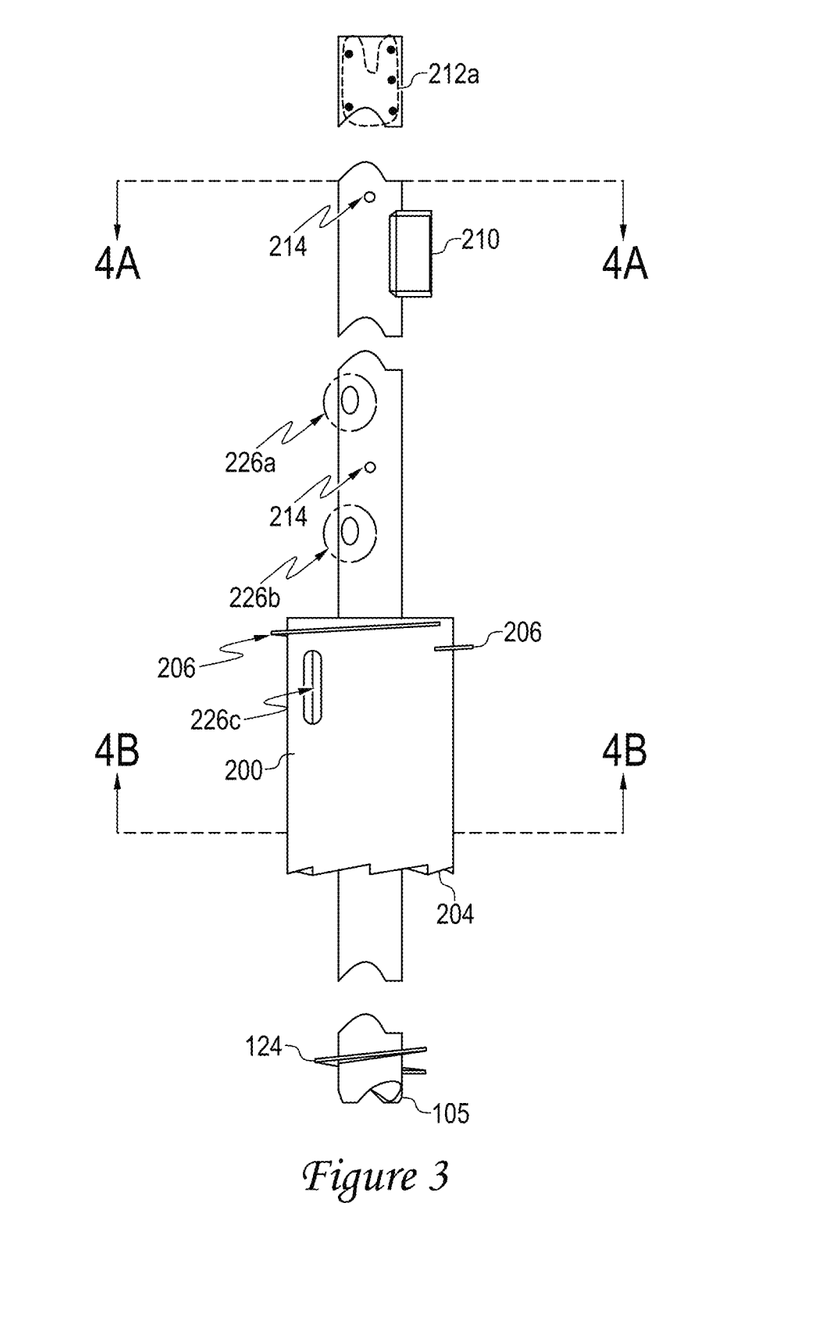

Referring now to FIGS. 2-3, there are depicted more detailed perspective and elevation views of an exemplary elongate support member in the load support system of FIG. 1.

Elongate support member 104 can be scaled or adapted to have any of a variety of combinations of length, diameter and sidewall thickness that is desired and/or necessary for a particular application and/or load 106. For example, in the illustrated application in which the load 106 supported by elongate support member 104 is a solar panel array, elongate support member 104 can be formed from galvanized steel pipe having a nominal diameter of 8 inches (e.g., schedule 40 galvanized pipe having a 8.625" outer diameter (OD) and 7.98" inner diameter (ID)) or of 6 inches (e.g., schedule 80 galvanized pipe having a 6.625" OD and 5.761" ID) and an overall length 108 along its long dimension of about 21 feet. In other applications, the dimensions of elongate support member 104 can be varied.

In the embodiment depicted in FIGS. 2-3, lateral support 122 has an outer wall 200 surrounding a substantially hollow (and in some preferred embodiments, completely hollow) interior volume in the annulus between the sidewall of elongate support member 104 and the outer wall 200 of lateral support 122. In various embodiments, the outer wall 200 of lateral support 122 has a thickness of between about 0.2 inches and about 0.6 inches, and more particularly, between about 0.25 inches and about 0.5 inches. The outer wall 200 of lateral support 122 can have an OD of between about 16 inches and about 30 inches, and more particularly, between about 20 inches and about 30 inches, and still more particularly, between about 20 inches and about 25 inches. In various embodiments, lateral support 122 has a height along the long axis of elongate support member 104 of between about 24 and about 60 inches, and more particularly, between about 30 inches and about 50 inches. Still more particularly, lateral support 122 can have a height of between about 30 inches and about 45 inches.

Figure 4A:
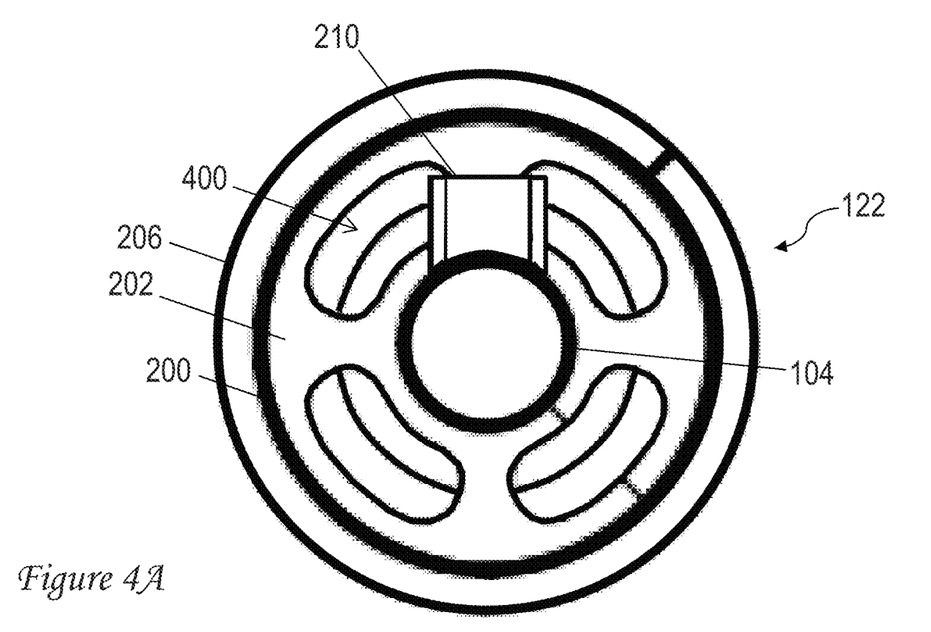
FIG. 4A is a section view along line 4A-4A in FIG. 3 in accordance with one embodiment.
Figure 4B:
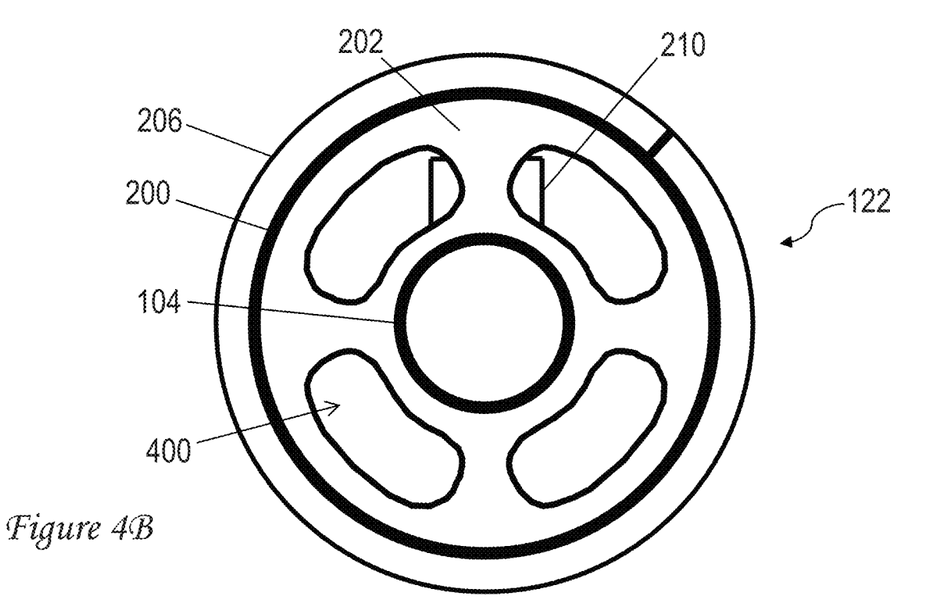
FIG. 4B is a section view along line 4B-4B in FIG. 3 in accordance with one embodiment.

As shown in FIG. 2 and additionally in FIGS. 4A-4B, lateral support 122 includes a top cap 202 that rigidly couples lateral support 122 to elongate support member 104. For example, top cap 202 may be welded to outer wall 200 and elongate support member 104. In some embodiments, top cap 202 can have (but is not required to have) a plurality of through holes 400, which permit use of a pneumatic tamper or the like to compact spoils within the interior volume of lateral support 122 during installation of elongate support member 104. The bottom or leading edge of lateral support 122 is preferably fully open to permit the free passage of spoils into the interior volume of lateral support 122.

Lateral support 122 may optionally include one or more additional features configured to aid installation of elongate support member 104. For example, lateral support 122 may include a dentigerous or toothed bottom (leading) edge 204 to facilitate clockwise or counter-clockwise rotational installation of elongate support member 104 in earth 118. Similarly, lateral support 122 may optionally have an external helix or screw 206 (e.g., welded to the external surface of outer wall 200) of the same handedness of helix 124. In at least one exemplary embodiment, helices 206 and 124 may be formed, for example, of ⅜ inch thick steel and have a 3-inch pitch right-hand thread. In some embodiments, one or more of helices 206 and 124 may have a lesser or greater pitch, for example, 6 inches, and/or a lesser or greater diameter and/or a different radial extent (e.g., 300 degrees rather than 360 degrees). In various embodiments, one or more of helices 206 and 124 may also have a beveled cutting edge rather than a blunt cutting edge. The helices 206 and 124 facilitate installation of first portion 114 of elongate support member 104 by cutting through earth 118 and further increase the resistance of load support system 102 to compression and tension forces.

In at least some embodiments, lateral support 122 is positioned along elongate support member 104 so that the top (trailing) edge of lateral support 122 will be below earth surface 120 or 120' when first portion 114 is fully embedded in earth 118. Burial of lateral support 122 increases available soil friction and permits use of cable vias, such as through holes 226a, 226b, and 226c, for routing optional power and/or control and/or signal communication lines. For example, in some embodiments, it is desirable if any through hole 226 utilized for routing power lines is at least 18 inches below surface 120 in order to satisfy the minimum burial depth for nonmetallic direct burial raceways per the National Electric Code (NEC). The provision of multiple through holes 226a, 226b, 226c in elongate support member 104 allows a range of embedment depths of first portion 114 while remaining within any applicable codes. Although not specifically illustrated in FIGS. 2-3, through hole 226c in outer wall 200 of lateral support 122 preferably has a unillustrated through hole in the sidewall of elongate support member 104 at a corresponding position along length 108 of elongate support member 104. Above-ground connections to the power and/or control lines can be made in a junction box 210.

In some embodiments, after one or more of holes 226 is/are formed in elongate support member 104 and lateral support 122, one or more of holes 226 may be substantially or fully covered after the hole(s) 226 is/are formed. For example, in one embodiment, a hole 226 may be covered by a field-removable cutout (e.g., the remnant of material cut out to form the hole 226) that is tack welded in place. Depending on the embedment depths of first portion 114 in different installations, different ones of the covers may be removed in the course of installation.

Although elongate support member 104 is generally illustrated in the figures as a unitary member, it should be appreciated that in some embodiments, elongate support member 104 can instead be formed by coupling two or more members. For example, in one embodiment, first portion 114 and second portion 116 are separable, and second portion 116 can be coupled to first portion 114 (e.g., by welding and/or a collar or other fixture and/or fasteners (e.g., breakaway bolts)), for example, following installation of first portion 114.

Generally, the present disclosure recognizes it would be useful and desirable to be able to manufacture, sell, and/or install a free-standing load support system having a predetermined configuration (e.g., having a predetermined length, predetermined diameter, predetermined wall thickness, etc.) that is suitable for embedded installation at a variety of installation sites characterized by differing soil conditions (e.g., moisture levels) and soil compositions (e.g., sand, gravel, silt, clay, etc.). However, in the prior art, no "one-size-fits-most" solution has been available to provide adequate structural support for embedded load support systems in differing soil conditions and soil compositions. As a result, the differences in the soil compositions and soil conditions at differing installation sites frequently led to conventional solutions, such as custom upsizing or downsizing of the lengths, diameters, and thicknesses of structural components of the load support system to accommodate the specific soil compositions and soil conditions at the various installation sites, the use of supplemental restraints (e.g., concrete footings or guy-wires), and/or the use of oversized installation machinery, such as customized excavators.

The present disclosure appreciates that these conventional solutions have attendant disadvantages. For example, site-specific customization of the configuration of the load support system can result in material and fabrication costs that are too high to be practical for many applications. Similarly, use of oversized installation machinery can drive up installation cost, create problems with accessing and damaging the installation site, and require specialized training, qualifications, licenses, and/or certifications for equipment operators. Further, use of supplemental restraints such as concrete footings and guy-wires can increase installation complexity and undesirably drive up installation time and cost.

In view of the prior art solutions that are available, the present disclosure recognizes that it would be useful and desirable to provide a substantially standardized load support system and associated installation methodology that are suitable for application to different installation sites having a variety of soil types and soil conditions. In addition, the present disclosure recognizes that it would be useful and desirable to provide a substantially standardized load support system and associated installation methodology suitable for use with commonly available and relatively inexpensive installation equipment. In accordance with the teachings contained herein, parameters of the installation methodology, rather than just the installation equipment or just the configuration of the load support system, can be modified to adjust load support system installation to accommodate site-specific soil compositions and soil conditions.

Figure 10:
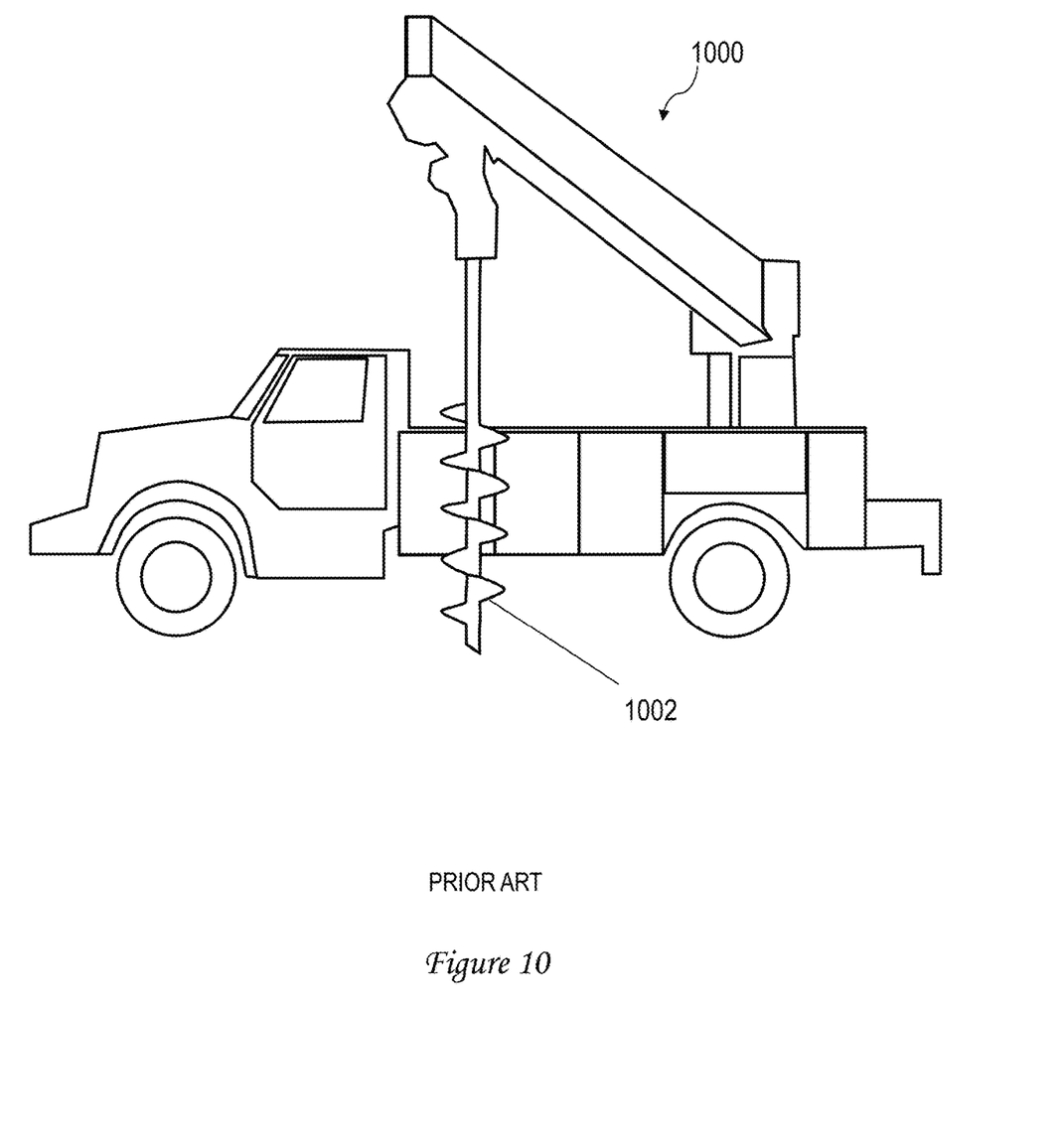
FIG. 10 depicts a conventional digger derrick truck that can be utilized to install a load support member in accordance with one embodiment.

For the embodiments shown in FIGS. 1-3, the installation methodology begins with selecting an installation site and forming a bore in earth 118 at the installation site. In at least one embodiment, the bore preferably has a depth greater than or equal to a dimension 125 (see FIG. 1), which is the maximum planned lateral support burial depth. In some embodiments, the bore has a depth of approximately a length of first portion 114 of elongate support member 104. In some embodiments, the bore has a depth that is between approximately 1 and 3 feet less than length of first portion 114 to allow engagement of helix 124 with soil at the bottom of the bore. In some embodiments, the bore has a depth approximately equal to a maximum depth supported by the installation equipment (e.g., the maximum boring depth of auger 1002 of the conventional utility digger derrick truck 1000 shown in FIG. 10). In at least one embodiment, the bore preferably has a diameter greater than the outer diameter of elongate support member 104, but less than the outer diameter of lateral support 122. For example, assuming lateral support 122 has an outer diameter of 24 inches and elongate support member 104 has an outer diameter of approximately 8.625 inches, the bore may have a diameter of 14 inches, 16 inches, 18 inches, 20 inches, or 22 inches. In at least some embodiments, the bore is formed utilizing an auger 1002 of a conventional utility digger derrick truck 1000, as shown in FIG. 10. Alternatively, the bore may be formed utilizing an auger driven by an excavator or skid-steer loader having a rotary drive or utilizing a similar towable or machine-mounted apparatus.

Following formation of the bore, the first portion 114 of load support system 102 may be installed within the bore. To embed first portion 114 in the bore formed in earth 118, first end 105 of elongate support member 104 is placed in the bore until the leading edge 204 of lateral support 122 contacts the earth's surface 120 or 120' surrounding the bore. The load support system 102 is then subject to a push down or crowd force and rotated by the tool head of the installation machine (e.g., utility digger derrick truck 1000), causing first portion 114 of elongate support member 104 and lateral support 122 to be screwed into earth 118. As this step continues, spoils surrounding the bore are collected within the annular interior volume of lateral support 122. This process step continues until a desired burial depth of first portion 114 and lateral support 122 is achieved. Rotary cutting of earth 118 can be facilitated not only by the configuration of first end 105 and one or more helices 124, 206, but also by teeth optionally formed on the leading edge 204 of lateral support 122. Handling of elongate support member 104 as well as filling of the void within elongate support member 104 (e.g., by earth 118 and/or another optional ballast such as concrete) is facilitated by through holes 226 in the sidewall of elongate support member 104.

In practice, it has been found that during installation, little if any spoils collected in the annular interior volume of lateral support member 122 exits the holes 400 in top cap 202 of lateral support 122. As a result, the torque required to continue to rotate elongate support member 104 rises quickly as the interior volume of lateral support member 122 approaches a full condition. Often, the maximum torque of the installation equipment utilized to install elongate support member 104 is met or exceeded when the spoils fill lateral support 122. As a result, the interior annular volume of lateral support 122 can be designed or selected to achieve a desired embedment depth of first portion 114 of load support system 102 in earth 118.

The relationship between embedment depth, configuration of the lateral support 122, and spoils consumed by lateral support 122 can be expressed utilizing the set of equations set forth below, which can be utilized to design an installation in advance. In practice, any given installation may deviate from the designed installation. The design equations utilize the following design variables, for which some example values are provided:

- Hlat=height of lateral support (e.g., 42.0")
- Hbg=height below ground (from surrounding ground surface to top of lateral support) (e.g., 24.0")
- Dauger=diameter of auger for pre-drill (e.g., 16.0")
- Delong=diameter of elongate support (e.g., 8.625")
- Dlat=diameter of lateral support (e.g., 24.0")
- Twall=wall thickness of lateral support (e.g., 0.25")
- Velong=volume of elongate support per Hlat
- Vlatlesswall=volume of lateral support less wall thickness
- Vpredrill=volume of excavated spoils from auger pre-drill
- Vdirt=volume of dirt to be consumed by lateral support
- Scomp=soil compressibility factor (typically varies between 0.5 and 1.0)

Utilizing these design variables, the following equations describe the installation:

Velong=pi*(Delong/2)^2*Hlat
Vpredrill=pi*(Dauger/2)^2*(Hlat+Hbg)
Vdirt=pi*(Dlat/2)?2*(Hlat+Hbg)−Vpredrill
Vlatlesswall=pi*((Dlat-2*Twall)/2)^2*(Hlat)
V % fill=(Vdirt*Scomp)/((Vlatlesswall-Velong)

The soil compressibility factor referenced in the equation set above is based on the soil's composition and expresses the degree to which a soil mass decreases in volume when supporting a load. In the equation set, the soil compressibility factor is specifically used to adjust the volume of spoils collected within the interior volume of lateral support 122 during rotational installation of load support system 102. Compressibility is lowest in coarse-grained soils in which particles are in contact with each other, increases as the proportion of small particles increases, and becomes highest in fine-grained soils which contain organic matter. The soil compressibility factor generally ranges between 1.0 (incompressible) to 0.5 (highly compressible).

Gravels and sands are practically incompressible and thus have a soil compressibility factor that is approximately 1. If a moist mass of these materials is subjected to compressive forces, there is no significant change in their volume. Clays, in contrast, are compressible. If a moist mass of clay is subjected to compressive forces, moisture and air may be expelled, resulting in volume reduction which is not immediately recovered when the load is removed. Thus, clay soils may have a soil compressibility factor nearer to 0.5.

A soil's compressibility factor is inversely proportional to the soil's Plasticity Index (PI), meaning that the greater the soil's compressibility factor, the less the soil's PI. It will be appreciated that in an alternative embodiment, an equivalent equation set can be developed to utilize a PI in place of a soil compressibility factor. Examples of PT values for various silt/clay soils are given in Table I below:

TABLE I

Plasticity Indices various silt/clay soils

| Category | Soil | PI (percentage) | Degree of plasticity |
|---|---|---|---|
| I | Sand or silt | 0-1 | Non-plastic |
|  | traces of | 1-5 | Slight plasticity |
|  | clay | 5-10 | Low plasticity |
|  | little clay |  |  |
| II | Clay loam | 10-20 | Medium plasticity |
| III | Silty clay | 20-35 | High plasticity |
|  | Clay | >35 | Very high plasticity |

In view of the foregoing, given a set of fixed dimensions for the components of the load support system and a known or likely soil composition, a suitable auger diameter for predrilling can be selected to ensure that rotation of load support system 102 by the installation equipment will automatically stop out when lateral support 122 reaches a desired embedment depth that is greater than the minimum allowable embedment depth, as that desired embedment depth will correspond to a point at which further rotation would require application of torque greater than the maximum torque of the installation equipment. When the maximum torque of the installation equipment is exceeded, the tool head of the installation equipment generally automatically enters into a bypass mode in which torque is removed from load support system 102. Because the automatic entry of the installation equipment into the bypass mode causes the rotation of load support system 102 to stop when the torque capacity of the installation equipment is exceeded, the load support system can be installed by a crew with a minimum amount of training, as the embedment depth is predetermined at design time.

Referring again to FIGS. 1-2, in some embodiments, a load 106 can be connected directly to second portion 116 of elongate support member 104. In other embodiments, such as that shown in FIG. 1, a load 106 can be mechanically coupled indirectly to elongate support member 104 via one or more intermediate member(s), such as fixture(s), frame(s), support(s), and/or housing(s). In at least some cases, it is preferred if the load 106 is coupled to elongate support member following embedment of first portion 114. As specifically shown in FIG. 2, in at least some embodiments, elongate support member 104 has multiple sets of load hole patterns 212*a*, 212*b*, 212*c* for coupling a load 106 at different locations along second portion 116. Thus, if first portion 114 is embedded deeper in earth 118, load 106 can be coupled to elongate support member 104 utilizing load hole pattern 212*a*. If first portion 114 is embedded less deeply, load 106 can be coupled to elongate support member 104 utilizing load hole pattern 212*b* or 212*c*. In this manner, loads 106 can be coupled to elongate support members 104 installed at the same installation site or different installation sites can have approximately equal heights above the earth's surface 120 or 120', despite a variation in embedment depths of their respective first portions 114. This is advantageous, for example, in properly designing loads 106 and elongate support members 104 for wind loads, providing a minimum clearance height between surface 120, 120' and load 106, and/or meeting applicable codes or standards.

To facilitate the installation of a load 106 following embedment of elongate support member 104, elongate support member 104 may optionally but preferably be equipped with a series of evenly spaced step holes 214 best seen in FIG. 2. Although only one side of elongate support member 104 is shown, it should be appreciation that step holes 214 are preferably provided on opposing sides of elongate support member 104 at matching or staggered locations along the long axis of elongate support member 104. Step holes 214 enable an installation technician to removably install steps on elongate support member 104, thus enabling the installation technician climb elongate support member to couple the load 106 to elongate support member 104 without use of a separate ladder or scaffolding. To free the installation technician's hands and promote safety, a conventional linesman's belt and positioning lanyard may also be employed.

Figure 5:
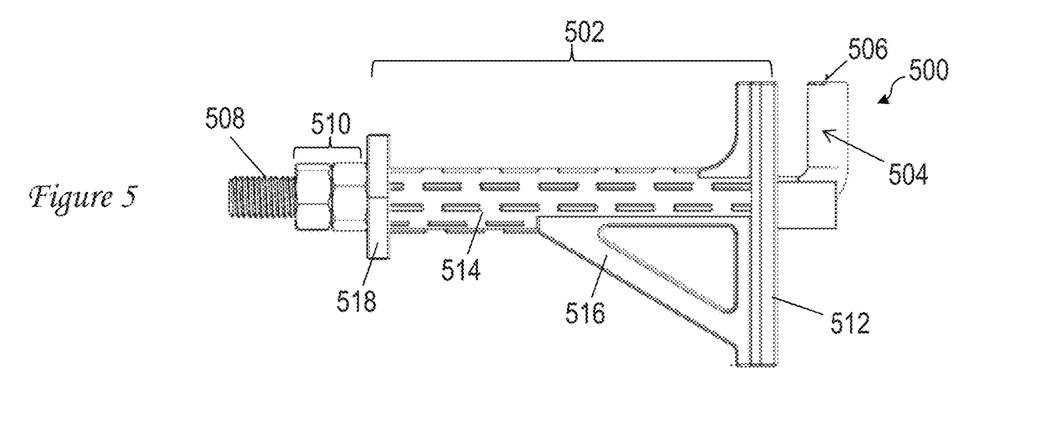
FIGS. 5-6 are elevation and plan views of a removable step in accordance with one embodiment.
Figure 6:
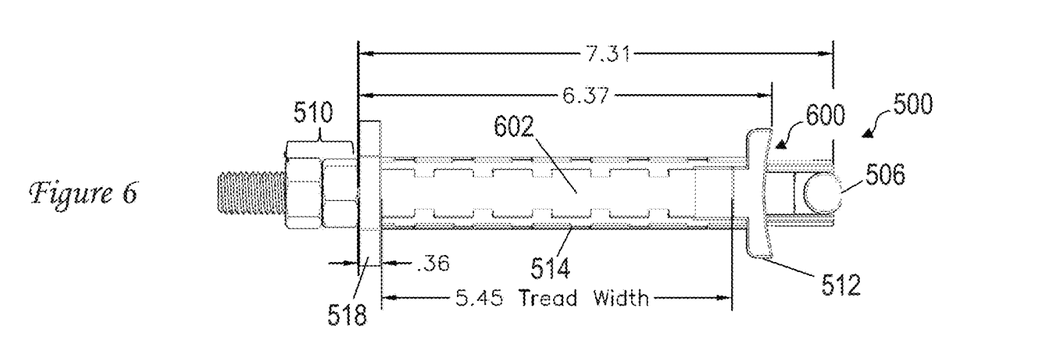

With reference now to FIGS. 5-6, there are illustrated an elevation and plan views of a removable step that may be utilized in combination with an elongate support member 104 in accordance with one embodiment. In the illustrated embodiment, removable step 500 takes the form generally disclosed in US D84417. Removable step 500 includes a frame 502 having a through hole formed there through, a generally L-shaped bolt 504 that is slidably receivable through the through hole formed in frame 502, and one or more fasteners 510. Bolt 504 includes a first end 506 and a threaded second end 508.

Frame 502 includes a first plate 512 configured to rest against the sidewall of elongate support member 104 when first end 506 of bolt 504 is inserted into one of step holes 214. As such, first plate may optionally have a slight concavity, as best seen in FIG. 6 at reference numeral 600. Frame 502 additionally includes a tread 514 supported from first plate 512 by an angle bracket 516. As indicated in FIG. 6, tread 514 may optionally have a flat tread surface 602 for improved safety and comfort. Finally, frame 502 includes a second plate 518 against which one or more fasteners 510, for example, a pair of internally threaded nuts, can be tightened.

In use, an installation technician would loosen fasteners 510, allowing first end 506 of bolt 504 to be partially withdrawn from the through hole formed in frame 502. The installation technician would then insert first end 506 of bolt 504 into one of step holes 214 at an acute angle with respect to the long axis of elongate support member 104 and then rotate step 500 downward, such that tread surface 602 is approximately orthogonal to the long axis of elongate support member 104 and first plate 512 contacts the sidewall of elongate support member 104. The installation technician would then tighten the one or more fasteners 510 against second plate 518, securing first end 506 in the chosen step hole 214 and securing first plate 512 against the sidewall of elongate support member 104. Optionally, step 500 can be removed from step hole 214 by simply reversing this process. It should be noted that although FIG. 6 provides exemplary dimensions (e.g., in inches), these dimensions are merely exemplary and therefore not limiting of the ranges of permissible dimensions of step 500.

Figure 7:
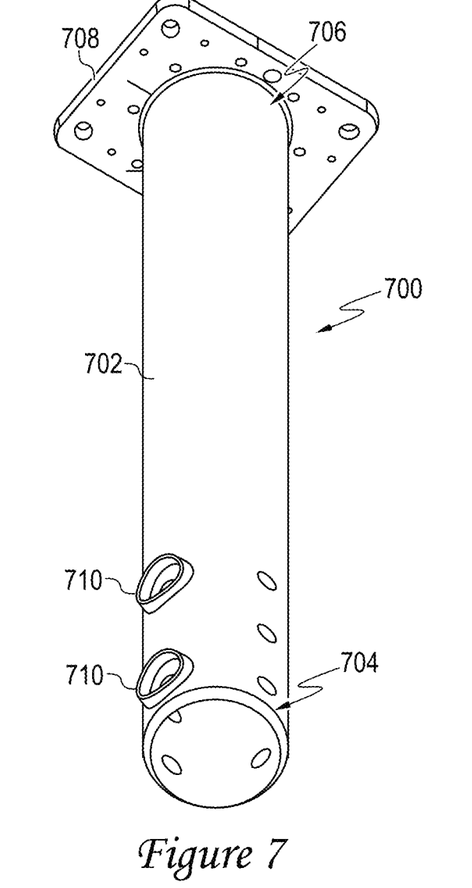
FIGS. 7-9 illustrate an exemplary pedestal for coupling a load to an elongate support member in accordance with one embodiment.
Figure 8:
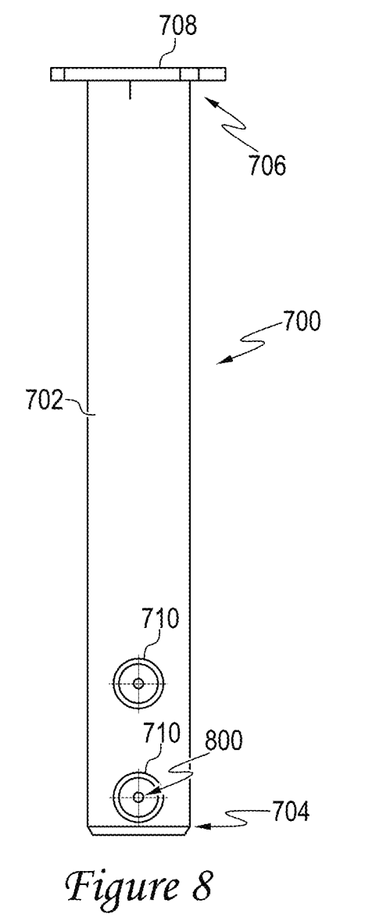
Figure 9:
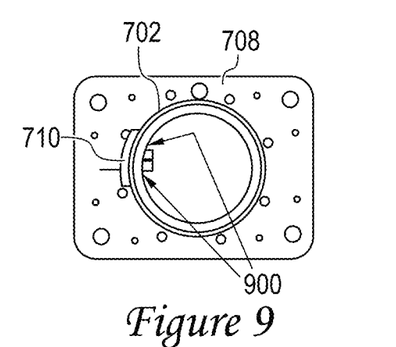

With reference now to FIGS. 7-9, there are illustrated perspective, side elevation, and bottom plan views of an exemplary pedestal 700 for coupling a load 106 to elongate support member 104 in accordance with one embodiment. In this example, pedestal 700, which may be formed, for example, of galvanized steel or aluminum, includes an elongate tube 702 having a first end 704 and second end 706. A mounting flange 708 is attached (e.g., welded) to second end 706. In the depicted example, mounting flange 708 has a hole pattern formed therein that is configured to support attachment of a load 106, for example, by bolts, screws, or other fasteners. Toward first end 704, pedestal 700 has a plurality of spacers 710 attached (e.g., welded) to the sidewall of tube 702. In the depicted example, spacers 710 are aligned with each other and distributed (i.e., spaced apart from one another) along the long axis of elongate tube 702. In this example, each spacer 710 has a thin raised lip protruding from the sidewall of tube 702 and surrounding a through hole 800 aligned with a corresponding through hole in the sidewall of tube 702, which is, in turn, backed by a captured (e.g., welded on) threaded nut 900 (as best seen in the bottom plan view given in FIG. 9).

In at least one embodiment, the overall dimension of tube 702 and spacers 710 measured along a diameter orthogonal to the long axis of tube 702 is selected to be such that tube 702 of pedestal 700 can be slidably received within the inner dimension of elongate support member 104 without application of substantial manual force in addition to gravitational force. In addition, at least the greatest dimension of flange 708 orthogonal to the long axis of tube 702 is selected to be greater than in the inner dimension of elongate support member 104 so that flange 708 provides a stop against second end 107 of elongate support member 104. In use, an installation technician inserts first end 704 of tube 702 into the interior of elongate support member 104 and aligns through holes 800 with corresponding holes in a desired one of load hole patterns 212*a*-212*c*. While holding this desired alignment, the installation technician then secures pedestal 700 to elongate support member 104 utilizing threaded bolts each passing through a respective hole in load hole pattern 212 and a through hole 800 and threadedly mating with a nut 900. The installation technician preferably tightens the bolts in nuts 900 such that the raised lips of all spacers 710 at least contact the inner surface of elongate support member 104 (and optionally deform by virtue of the compressive force applied by the bolt and nut) such that movement of pedestal 700 relative to elongate support member 104 (e.g., rattle) is reduced.

It will be appreciated by those skilled in the art that the coupling arrangement between pedestal and elongate support member is subject to a number of variations of the design depicted in FIGS. 7-9. For example, in some embodiments, the end of elongate support member 104 can alternatively be received within the inside diameter of pedestal 700. In some embodiments, spacers 710 may alternatively be fixedly attached to the exterior sidewall of whichever one of the elongate support member and pedestal that is received into the interior volume of other member. In this case, nuts 900 may be fixedly attached to the interior sidewall of the member to which spacers 710 are attached. Alternatively, spacers 710 may be attached to the interior surface of a larger diameter pedestal received over the exterior surface of the elongate support member, with the nuts 900 fixedly attached to the interior sidewall of the elongate support member.

As has been described, in at least one embodiment, a load support system includes an elongate support member having a first diameter and a first end and a second end. The elongate support member includes, toward the first end, a first portion for direct earth burial and further includes, toward the second end, a second portion to which the load can be coupled. The first portion has a first length. The system additionally includes a lateral support having a second diameter greater than the first diameter and a second length less than the first length. The lateral support is mounted about the first portion of the elongate support member. The lateral support includes a first opening formed therein at a first location relative to a long axis of the elongate support member and a second opening formed therein at a different second location relative to the long axis in order to support a range of embedment depths.

Although embodiments have been described in which the load is a solar panel array, it should be appreciated that the inventions disclosed herein can be utilized with any desired load. In some alternative embodiments, that load can be a solar concentrator, solar collector, solar reflector, antenna or directional signage.

While the present invention has been particularly shown as described with reference to one or more preferred embodiments, it will be understood by those skilled in the art that various changes in form and detail may be made therein without departing from the spirit and scope of the invention. The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A load support system, comprising:
  an elongate support member having a first diameter and a first end and a second end, wherein the elongate support member includes, toward the first end, a first portion for direct earth burial and further includes, toward the second end, a second portion to which the load can be coupled, wherein the first portion has a first length;
  a lateral support having a second diameter greater than the first diameter and a second length less than the first length, wherein the lateral support has a substantially cylindrical curved outer wall and is mounted about the first portion of the elongate support member;
  a helix formed at least partially about an exterior surface of the substantially cylindrical curved outer wall of the lateral support; and
  wherein the substantially cylindrical curved outer wall of the lateral support has a first opening formed therethrough at a first location relative to a long axis of the elongate support member and the elongate support member includes a second opening formed therein at a different second location relative to the long axis of the elongate support member, such that a range of embedment depths of the first portion of the elongate support member is supported.

2. The load support system of claim 1, and further comprising a pedestal for coupling the load to the elongate support member, wherein the pedestal includes an elongate tube received within the elongate support member.

3. The load support system of claim 2, wherein:
  the second portion of the elongate support member includes a mounting hole;
  the elongate tube of the pedestal has an exterior surface and an interior surface, a plurality of spacers distributed along the elongate tube that protrude from the exterior surface of the tube, a plurality of holes through the spacers and the tube, and a respective one of a plurality of threaded nuts fixedly attached to the interior surface of the tube at each of the plurality of holes.

4. The load support system of claim 1, wherein:
  the elongate support includes a series of holes along the second portion for receiving removable steps; and
  the load support system further includes at least one removable step configured to be inserted in one of the series of holes and removably coupled to the elongate support.

5. The load support system of claim 1, wherein the second portion of the elongate support member has multiple sets of load mounting holes formed therein, such that a range of embedment depths of the first portion of the elongate support member is supported.

6. The load support system of claim 1, wherein an interior volume of the lateral support is selected to determine an embedment depth of the first portion of the elongate support member.

7. The load support system of claim 1, wherein:
  the lateral support includes a top cap coupling the substantially cylindrical curved outer wall of the lateral support to the elongate support member; and
  the lateral support encloses a substantially hollow annular interior volume between the substantially cylindrical curved outer wall and the elongate support member.

8. The load support system of claim 1, wherein:
  the substantially cylindrical curved outer wall of the lateral support has opposing first and second ends, wherein the first end of the substantially cylindrical curved outer wall is closer to the first end of the elongate support member, and wherein the second end of the substantially cylindrical curved outer wall is closer to the second end of the elongate support member; and the helix is formed about the exterior surface proximate to the second end of the substantially cylindrical curved outer wall.

9. A load support system, comprising:

an elongate support member having a first diameter and a first end and a second end, wherein the elongate support member includes, toward the first end, a first portion for direct earth burial and further includes, toward the second end, a second portion to which the load can be coupled, wherein the first portion has a first length;

a lateral support having a second diameter greater than the first diameter and a second length less than the first length, wherein the lateral support has a substantially cylindrical curved outer wall and is mounted about the first portion of the elongate support member to form a hollow interior annular volume between the substantially cylindrical curved outer wall of the lateral support and the elongate support member, said hollow interior annular volume being chosen to select an embedment depth corresponding to a given installation torque; and a helix formed at least partially about an exterior surface of the substantially cylindrical curved outer wall of the lateral support;

wherein:

the second portion of the elongate support member includes a plurality of sets of load mounting features at respective differing distances from the second end, such that a load can be coupled to the elongate support member at one of the plurality of sets of load mounting features to substantially achieve a desired clearance height for the load despite variability in the embedment depth; and the substantially cylindrical curved outer wall of the lateral support has a first opening formed therethrough at a first location relative to a long axis of the elongate support member and the elongate support member includes a second opening formed therein at a different second location relative to the long axis of the elongate support member, such that a range of embedment depths of the first portion of the elongate support member is supported.

10. The load support system of claim 9, wherein:

the elongate support includes a series of holes along the second portion for receiving removable steps; and the load support system further includes at least one removable step configured to be inserted in one of the series of holes and removably coupled to the elongate support.

11. The load support system of claim 9, wherein the plurality of sets of load mounting features includes multiple sets of load mounting holes.

12. The load support system of claim 9, wherein the lateral support includes a top cap coupling the substantially cylindrical curved outer wall of the lateral support to the elongate support member.

13. A load support system, comprising:

an elongate support member having a first diameter and a first end and a second end, wherein the elongate support member includes, toward the first end, a first portion for direct earth burial and further includes, toward the second end, a second portion to which the load can be coupled, wherein the first portion has a first length, and wherein the second portion of the elongate support member includes a plurality of sets of load mounting features at respective differing distances from the second end, such that a load can be coupled to the elongate support member at one of the plurality of sets of load mounting features to substantially achieve a desired clearance height for the load despite variability in the embedment depth;

a lateral support having a second diameter greater than the first diameter and a second length less than the first length, wherein the lateral support has a substantially cylindrical curved outer wall and is mounted about the first portion of the elongate support member to form a hollow interior annular volume between the substantially cylindrical curved outer wall of the lateral support and the elongate support member, said hollow interior annular volume being chosen to select an embedment depth corresponding to a given installation torque;

a helix formed at least partially about an exterior surface of the substantially cylindrical curved outer wall of the lateral support; and a pedestal for coupling the load to the elongate support member, wherein:

the pedestal includes an elongate tube received within the elongate support member;

the pedestal is coupled to said one of the plurality of sets of load mounting features;

the second portion of the elongate support member includes a mounting hole; and the elongate tube of the pedestal has an exterior surface and an interior surface, a plurality of spacers distributed along the elongate tube that protrude from the exterior surface of the tube, a plurality of holes through the spacers and the tube, and a respective one of a plurality of threaded nuts fixedly attached to the interior surface of the tube at each of the plurality of holes.

14. The load support system of claim 13, wherein:

the elongate support includes a series of holes along the second portion for receiving removable steps; and the load support system further includes at least one removable step configured to be inserted in one of the series of holes and removably coupled to the elongate support.

15. The load support system of claim 13, wherein the plurality of sets of load mounting features includes multiple sets of load mounting holes.

16. The load support system of claim 13, wherein the lateral support includes a top cap coupling the substantially cylindrical curved outer wall of the lateral support to the elongate support member.

17. A load support system, comprising:

an elongate support member including a sidewall having a mounting hole therein;

a pedestal for coupling a load to the elongate support member, wherein the pedestal includes an elongate tube received within the elongate support member;

wherein the elongate tube has an exterior surface and an interior surface, a plurality of spacers distributed along the elongate tube that protrude from the exterior surface of the tube, a plurality of holes through the spacers and the elongate tube, and a respective one of a plurality of threaded nuts fixedly attached to the interior surface of the elongate tube at each of the plurality of holes; and a bolt extending through the mounting hole in the elongate support member, extending through a hole of a spacer among the plurality of spacers, and threadedly engaging a threaded nut among the plurality of threaded nuts.

18. The load support system of claim 17, further comprising a load coupled to the pedestal.

19. The load support system of claim 17, wherein the spacer is configured to be deformed by contact with the elongate support member due to a compressive force applied by the bolt and threaded nut.

20. A system, comprising:
 a load support system in accordance with claim 1; and
 a load coupled to the load support system.

21. The system of claim 20, wherein the load includes at least one solar panel.

22. A system, comprising:
 a load support system in accordance with claim 9; and
 a load coupled to the load support system.

23. The system of claim 22, wherein the load includes at least one solar panel.

24. A system, comprising:
 a load support system in accordance with claim 13; and
 a load coupled to the load support system.

25. The system of claim 24, wherein the load includes at least one solar panel.

26. A method of installing a load support system, the method comprising:
 providing a load support system, including:
  an elongate support member having a first diameter and a first end and a second end, wherein the elongate support member includes, toward the first end, a first portion for direct earth burial and further includes, toward the second end, a second portion to which the load can be coupled, wherein the first portion has a first length;
  a lateral support having a second diameter greater than the first diameter and a second length less than the first length, wherein the lateral support has a substantially cylindrical curved outer wall and is mounted about the first portion of the elongate support member;
  a helix formed at least partially about an exterior surface of the substantially cylindrical curved outer wall of the lateral support;
  wherein the substantially cylindrical curved outer wall of the lateral support has a first opening formed therethrough at a first location relative to a long axis of the elongate support member and the elongate support member includes a second opening formed therein at a different second location relative to the long axis of the elongate support member, such that a range of embedment depths of the first portion of the elongate support member is supported;
 forming a bore in the earth having a diameter less than that of the lateral support; and
 placing the first end of the elongate support member in the bore and rotationally installing the first portion of the elongate support member and the lateral support in the earth.

27. The method of claim 26, further comprising stopping rotational installation of the first portion of the elongate support member based on spoils filling a volume of the lateral support.

28. The method of claim 26, wherein:
 the rotationally installing includes rotationally installing until at least one of the first and second openings is below a surface of the earth by at least a predetermined distance.

* * * * *